US012489966B2

(12) United States Patent
Luo et al.

(10) Patent No.: US 12,489,966 B2
(45) Date of Patent: Dec. 2, 2025

(54) METHOD AND APPARATUS FOR IMAGE CAPTURING

(71) Applicant: QUALCOMM Incorporated, San Diego, CA (US)

(72) Inventors: Jiafu Luo, Irvine, CA (US); Xiaoyun Jiang, San Diego, CA (US); Narayana Karthik Ravirala, San Diego, CA (US); Jianyou Li, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 116 days.

(21) Appl. No.: 18/305,304

(22) Filed: Apr. 21, 2023

(65) Prior Publication Data

US 2024/0357224 A1 Oct. 24, 2024

(51) Int. Cl.
*H04N 23/63* (2023.01)
*G06F 18/25* (2023.01)
*G06T 7/00* (2017.01)
*H04N 23/57* (2023.01)
*H04N 23/65* (2023.01)
(Continued)

(52) U.S. Cl.
CPC ............ *H04N 23/632* (2023.01); *G06T 7/97* (2017.01); *H04N 23/57* (2023.01); *H04N 23/65* (2023.01); *H04N 23/69* (2023.01); *H04N 25/46* (2023.01); *H04N 25/47* (2023.01);
(Continued)

(58) Field of Classification Search
CPC ...... H04N 23/632; H04N 23/57; H04N 23/69; H04N 23/65; H04N 25/47; H04N 25/46; H04N 23/631; H04N 23/635; H04N 23/676; H04N 23/741; H04N 23/743; H04N 23/80; G06T 7/97; G06T 2207/10144;
(Continued)

(56) References Cited

U.S. PATENT DOCUMENTS 11,113,802 B1 * 9/2021 Sun ...................... H04N 23/743
12,058,448 B1 * 8/2024 Sun ...................... H04N 23/743
(Continued)

FOREIGN PATENT DOCUMENTS

| CN | 115134511 A | 9/2022 |
| CN | 115706870 A | 2/2023 |
| EP | 2940992 A1 | 11/2015 |

OTHER PUBLICATIONS

International Search Report and Written Opinion—PCT/US2024/023222—ISA/EPO—Jul. 16, 2024 (2300425WO).

*Primary Examiner* — Marly S Camargo
(74) *Attorney, Agent, or Firm* — QUALCOMM Incorporated

(57) ABSTRACT

Systems and methods for image fusing are described. In examples, a first image of a scene may be obtained associated with a first parameter and a second image of the scene may be obtained associated with a second parameter. The first image and the second image may be fused to obtain at least one first fused image. A third image of the scene may be obtained associated with a third parameter and a fourth image of the scene may be obtained associated with a fourth image. At least one parameter associated with the third image and the fourth image used to obtain the images may be adjusted, wherein the adjustment may be based at least in part on a field of view of the at least one first fused image. The third image and the fourth image may be fused to obtain a second fused image.

30 Claims, 6 Drawing Sheets

(51) Int. Cl.
  *H04N 23/69*  (2023.01)
  *H04N 23/743*  (2023.01)
  *H04N 25/46*  (2023.01)
  *H04N 25/47*  (2023.01)

(52) U.S. Cl.
  CPC .............. *G06T 2207/10144* (2013.01); *G06T 2207/20104* (2013.01); *G06T 2207/20221* (2013.01)

(58) Field of Classification Search
  CPC . G06T 2207/20104; G06T 2207/20221; G06F 18/25; G06F 18/259
  See application file for complete search history.

(56) References Cited

U.S. PATENT DOCUMENTS

| | | |
|---|---|---|
| 2021/0075969 A1 | 3/2021 | Liu et al. |
| 2021/0366084 A1 | 11/2021 | Lin et al. |
| 2021/0390747 A1* | 12/2021 | Feng ................ G06T 11/60 |
| 2024/0137650 A1 | 4/2024 | Cui |

* cited by examiner

METHOD AND APPARATUS FOR IMAGE CAPTURING

BACKGROUND

Aspects of the disclosure relate to image processing, and in particular, to method and apparatuses for high dynamic range (HDR) image capturing. In the last several decades, the use of electronic devices has become common. Advances in electronic technology have reduced the cost of increasingly complex and useful electronic devices. Cost reduction and consumer demand have proliferated the use of electronic devices such that they are practically ubiquitous in modern society. As the use of electronic devices has expanded, so has the demand for new and improved features of electronic devices. More specifically, electronic devices that perform functions faster, more efficiently or with higher quality are often sought after.

Devices such as digital cameras, mobile phones with embedded cameras, or other camera or sensor devices may be used to create and store images of a scene. Lately in photography and videography, multi-exposure HDR image capturing has become highly relevant. Thereby, images of the same scene are taken at different exposure levels and are then combined. Combining multiple images in this way results in an image with a greater dynamic range than what would be possible by taking one single image. The technique can also be used to capture video by taking and combining multiple exposures for each frame of the video. Many mobile phones have an automated HDR feature that relies on computational imaging techniques to capture and combine multiple exposures. Lately it has also become common to use pixel binning techniques to arrive at HDR image with a single shot. As known in the field, pixel binning relates to the grouping together (binning) of adjacent pixels to form superpixels. This binning occurs before the output of the superpixel is converted to digital information and can provide better low-light performance at the expense of some image resolution. As described before, HDR images are made out of a fusion of at least two images. These images may be separately captured images, however, when pixel binning is used, the images may also be constituted by the sub-pixels of a superpixel, wherein one image is constituted by one set of sub-pixels of the superpixel and the other image is constituted by another set of sub-pixels of the superpixel, wherein the first and second sets are different. This becomes possible because each of a superpixel's individual sub-pixels can be independently tuned to better capture highlights or shadows before their outputs are combined. The result is a superpixel that is able to capture dark shadows and bright highlights simultaneously. This real-time HDR function makes it easier to capture HDR images of moving objects while also enabling HDR video capture.

Nevertheless, the computational complexity of combining or fusing at least two images, either separately taken or in form of sub-pixels, is a resource intensive process and capturing images as such may take a large amount of power or device resources than is preferable to a device user, even more so if the device is a mobile device with limited battery power. Methods and apparatuses of improving efficiency in capturing HDR images may therefore be desirable.

BRIEF SUMMARY

A method, an apparatus, and a non-transitory computer-readable medium for improving image capturing and fusing are described. The method, the apparatus, and the on-transitory computer-readable medium may relate to HDR image capturing. However, the techniques described herein may also equally be applicable to other image capturing techniques which rely on a combination of more than one image. Furthermore, although it is referred to images, a person skilled in the art will realize that the techniques described herein are equally applicable to video frames, which are a sequence of images.

The following presents a simplified summary relating to one or more aspects disclosed herein. Thus, the following summary should not be considered as an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the techniques disclosed herein in a simplified form to precede the detailed description presented below. The invention is defined by the claims. Embodiments and aspects that do not fall within the scope of the claims are merely examples used for explanation of the invention.

In an aspect, a method for image fusing is described. The method comprises obtaining a first image of a scene associated with a first parameter and obtaining a second image of the scene associated with a second parameter. Although it is described that only two images are obtained, it shall also be contemplated that more than two images are obtained. The two images may be separately obtained by at least one or a plurality of image capturing devices, it can also be said two shots of the same scene are taken, or the images represent different sets of sub-pixels of a single shot taken by one image capturing device. The method may further comprise fusing the first image and the second image to obtain at least one first fused image. Subsequently a third image of the scene associated with a third parameter and a fourth image of the scene associated with a fourth image may be obtained. Also here, only two images are named, but more than two are contemplated. Furthermore, the third image and the fourth image may be separately obtained or may again be different sets of sub-pixels. At least one parameter associated with the third image and the fourth image used to obtain the images may be adjusted, wherein the adjustment is based at least in part on a field of view of the at least one first fused image. The method then may comprise to fuse the third image and the fourth image to obtain a second fused image.

In one aspect, the method may further comprise previewing the at least one first fused image before obtaining the third image and the fourth image. For previewing the fused image, a tone mapping may be performed which adapts the fused image to a respective display of a device on which the first fused image is displayed.

In one aspect of the method, the parameters associated with the images are output pixel count values of the images. The pixel count value is directly related to the resolution of the image. The higher the count value is the more pixels of the image capturing device are individually used to obtain the image, hence high resolution images are obtained. A lower count value indicates that either in general less pixels are used or that more pixels are binned to form superpixels. The count value as such can also relate to the binning mode used. The parameter may also be referred to as the setting used to obtain the images. The setting may thereby be used by the at least one image capturing device to obtain the images.

In one aspect, the method may further comprise adjusting the at least one of the third parameter or the fourth parameter based on a power mode. The power mode may be the power mode of the overall device used to capture the images or the image capturing device itself, which forms part of the overall device to capture the images. Thereby, in a low power mode at least one of the parameters may be adjusted to have a lower value than in a normal power mode. For example, when the parameter relates to the pixel count value, then a lower count value indicates that more pixels are binned, in which case the image is obtained at lower resolution, whereas a higher value may indicate that less pixels are binned up to none at all, in which case the image is obtained at full resolution.

In one aspect of the method, the adjustment may be based on a determination whether a threshold is exceeded. The threshold may be associated with a power threshold of the device. For example an adjustment may be triggered once a power threshold is exceeded. Additionally or alternatively, the threshold may also relate to a resolution the first fused image has in the field of view. Thereby, the threshold may relate to a zoom factor used in the field of view. For example, if the first fused image was obtained by fusing the first image obtained at full resolution and the second image at half resolution, then a zoom factor of two would still result in no noticeable artefacts, whereas a zoom factor of three may lead to noticeable artefacts, such that the resolution for at least one of the third image or fourth image needs to be increased. In this example, the threshold would be associated with the zoom factor. It should however also be clear to a person skilled in the art that in the aforementioned example, which shall not be regarded to be limiting, the threshold of a zoom factor of two also depends on the display capabilities on which the first fused image is displayed. Depending upon the display capabilities noticeable artefacts may also only become visible at a higher zoom factor or before.

In one aspect of the method, the first image and the second image and/or the third image and the fourth image may be captured with different exposure values.

In one aspect of the method, said fusing of the first image and the second image comprises fusing the first image and the second image on a pixel-by-pixel basis and/or wherein said fusing of the third image and the fourth image comprises fusing the third image and the fourth image on a pixel-by-pixel basis.

In one aspect, the method may further comprise receiving an input from a user associated with a region of interest in the first fused image and determining the field of view based on the region of interest. The user input may be a zoom-in or zoom-out action. In case the user input is a zoom action, the zoom factor and therefore the field of view of the first fused image may be changed dependent upon the region of interest. For example, the user may zoom into a specific region of interest in the first fused image, which will change the zoom factor of the first fused image and the field of view presented to the user. The user input may be received via a touchscreen of the device. The action of the user may thereby have an influence on the adjustment of the at least third or fourth parameter used to obtain the third and fourth image. For example, if it is zoomed in and the parameters used to obtain the first image and the second image lead to noticeable artifacts in the new field of view of the first fused image, at least one of the third parameter or the fourth parameter will be adjusted for obtaining the third image and the fourth image, such that their resulting second fused image will not exhibit noticeable artefacts. The adjustment in this case may be that at least one of the third image or the fourth image are obtained using a higher pixel count value, e.g. higher resolution, as used for obtaining the first image or the second image. Also the other way around is possible, in case a user zooms out then the resolution of at least one of the third image or fourth image can be reduced as compared to the resolution used for the first image and/or the second image.

In one aspect, the method may further comprise storing the at least one second fused image. Storing may comprise storing the image in a memory of the device and/or uploading the second fused image to a cloud storage system.

In one aspect of the method, the obtaining may comprise obtaining the images from at least one image capturing device. The at least one image capturing device may be configured to capture images with different pixel count values. Thereby, the image capturing device may comprise an image sensor which is capable of obtaining images at different pixel count values, respectively apply different binning modes, such that images with different resolution can be obtained.

Although the aspects of the method are described in separate paragraphs it shall be contemplated that all of the aspects of the method are combinable, and no aspects rules out the other. Hence, each of the aspects described herein are separately or together be combinable with the general aspect of the described method.

In an aspect, an apparatus for image capturing and fusing is described. The apparatus comprises at least one image capturing device configured to obtain at least a first image of a scene associated with a first parameter, a second image of the scene associated with a second parameter, a third image of the scene associated with a third parameter, and a fourth image of the scene associated with a fourth parameter. It shall be contemplated that the described images are either obtained separately by the at least one image capturing device or the first image and the second image as well as the third image and the fourth image are constituted by sub-pixels of two images. The apparatus further comprises at least one or more processors configured to fuse the first image and second image to obtain a first fused image, adjust based at least in part on a field of view of the first fused image, at least one of the third parameter or the fourth parameter to be used to obtain the third image or the fourth image and fuse the third image and the fourth image to obtain a second fused image. The apparatus may also comprise at least one memory for storing the fused images.

In one aspect of the apparatus, the at least one image capturing device may be configured to obtain images at different pixel count values and the parameters associated with the images may relate to the pixel count value with which the respective image is obtained. Thereby, the pixel count value relates to the resolution the images are obtained with. This may also be linked to the binning mode used by the at least one image capturing device.

In one aspect of the apparatus, the adjustment may further be dependent upon a power mode of the apparatus. Thereby, in a low power mode at least one of the third parameter or fourth parameter may be adjusted to have a lower value than in a normal power mode and/or as compared to at least one of the first parameter or second parameter. It is contemplated that also more than one parameter may be adjusted and that under different circumstances different parameters may be adjusted.

In one aspect of the apparatus, the one or more processors may be configured to adjust the at least one of the third parameter or the fourth parameter when a threshold is exceeded. Thereby, the threshold may be associated with a resolution loss of the fused image in the field of view, e.g.

noticeable artefacts in the zoomed in region of interest. Additionally or alternatively, the threshold may be associated with a power consumption of the apparatus.

In one aspect of the apparatus, the first image and the second image and/or the third image and the fourth image are captured with different exposure values.

In one aspect of the apparatus, the one or more processors may be configured to fuse the first image and the second image on a pixel-by-pixel basis and/or fuse the third image and the fourth image on a pixel-by-pixel basis. Thereby, the one or more processors may be further configured to select for each pixel of the first fused image one pixel from the first image or the second image and to select for each pixel of the second fused image one pixel from the third image or the fourth image. It is also contemplated that the first image may be constituted by sub-pixels of a superpixel image and the second image may be constituted by other subpixels of the superpixel image and the one or more processors are configured to fuse the sub-pixels, and/or wherein the third image may be constituted by sub-pixels of a superpixel image and the fourth image may be constituted by other sub-pixels of the superpixel image and the one or more processors may be configured to fuse the sub-pixels.

In one aspect of the apparatus, the one or more processors may be configured to receive an input from a user associated with a region of interest in the first fused image and determine the field of view based on the region of interest. The user input may be a zoom-in or zoom-out action. The user input may be received via a touchscreen of the apparatus.

In one aspect of the apparatus, the apparatus may be part of a handheld camera, a mobile phone.

Although the aspects of the apparatus are described in separate paragraphs it shall be contemplated that all of the aspects of the apparatus are combinable and no aspects rules out the other. Hence, each of the aspects described herein are separately or together be combinable with the general aspect of the described apparatus.

In an aspect, an apparatus for image capturing and fusing is described. The apparatus comprises means for obtaining a first image of a scene associated with a first parameter, means for obtaining a second image of the scene associated with a second parameter, means for fusing the first image and the second image to obtain a first fused image, means for adjusting at least one of a third parameter or a fourth parameter to be used to obtain a third image and a fourth image, wherein the adjustment is based at least in part on a field of view in the at least one first fused image, means for obtaining the third image of the scene associated with the third parameter, means for obtaining a fourth image of the scene associated with the fourth parameter and means for fusing the third image and the fourth image to obtain a second fused image.

In an aspect, a non-transitory computer-readable medium having stored thereon instructions is described. The instructions when executed by one or more processors cause the one or more processors to obtain a first image of a scene associated with a first parameter, and obtain a second image of the scene associated with a second parameter, fuse the first image and the second image to obtain a first fused image, obtain a third image of the scene associated with a third parameter, and obtain a fourth image of the scene associated with a fourth parameter, wherein at least one of the third parameter or the fourth parameter is adjusted, wherein the adjustment is based at least in part on a field of view in the at least one first fused image and fuse the third image and the fourth image to obtain a second fused image.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof. In the appended figures, similar components or features may have the same reference number. Further, various components of the same type may be distinguished by a letter attached to the reference number. If only the reference number is used in the specification, the description is applicable to any one of the similar components having the same first reference number irrespective of the letter attached.

DETAILED DESCRIPTION

Figure 1:
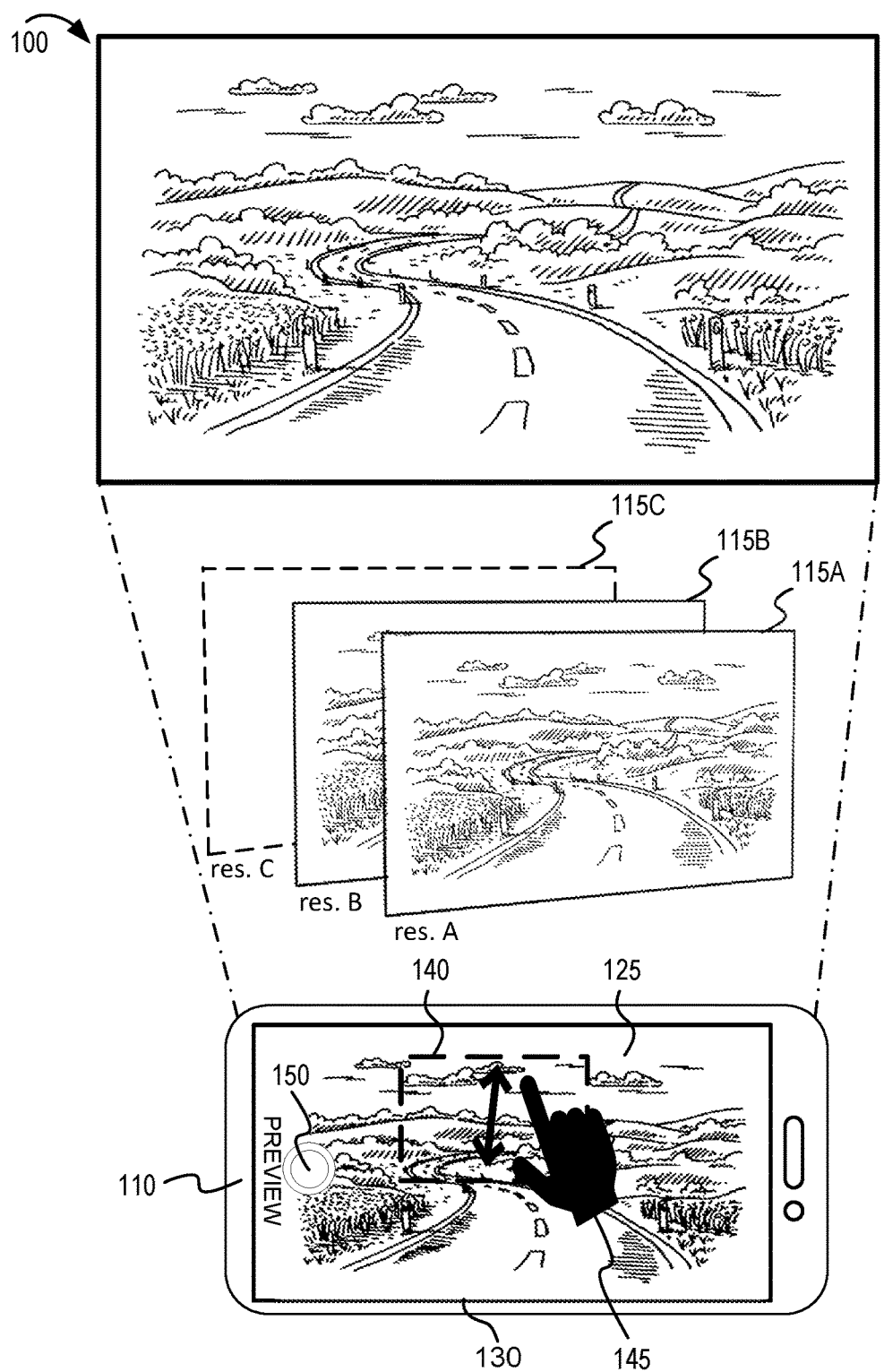
FIG. 1 illustrates aspects of a device which may perform image capturing and fusing in accordance with the embodiments described herein.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure. It should be understood that various changes may be made in the function and arrangement of elements without departing from the scope of the application as set forth in the appended claims.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

A "scene" as referred to herein is a place or view of an area which is captured by a camera of a device in one or more related images. Thus, related images of a movie captured by a device may be images of the same scene, even if each of the images are not covering the exact same space. In certain embodiments, a scene or portion of a scene may also thus refer to a place or view that comprises only a portion of the area or field of view captured by the device.

A camera is a device that receives light and captures images, such as still images or video frames, using an image sensor. Examples of sensors in a camera may include semiconductor charge-coupled devices (CCD) and active pixel sensors in complementary metal-oxide-semiconductor (CMOS) or N-type metal oxide-semiconductor (NMOS). The terms "image," "image frame," and "frame" are used interchangeably herein. Cameras may include processors, such as image signal processors (ISPs), that can receive one or more images and process the one or more images. For example, a raw image captured by a camera sensor can be processed by an ISP to generate a final image. Processing by the ISP can be performed by a plurality of filters or processing blocks being applied to the captured image, such as denoising or noise filtering, edge enhancement, color balancing, contrast, intensity adjustment (such as darkening or lightening), tone adjustment, among others. Image processing blocks or modules may include lens/sensor noise correction, Bayer filters, de-mosaicing, color conversion, correction or enhancement/suppression of image attributes, denoising filters, sharpening filters, among others.

Cameras can be configured with a variety of image capture and image processing settings. Application of different settings can result in images with different appearances. These settings may also be referred to as parameters. Some camera settings are determined and applied before or during capture of the image, such as ISO, exposure time, resolution, aperture size, f/stop, shutter speed, focus, and gain. Other camera settings can configure post-processing of an image, such as alterations to contrast, brightness, saturation, sharpness, levels, curves, or colors.

In many camera systems, a host processor (HP) (also referred to as an application processor (AP) in some cases) is used to dynamically configure an image sensor with new parameters. The HP is also used to dynamically configure parameter settings of the ISP pipelines to match the exact settings of an input image sensor frame so that the image data is processed correctly.

When camera systems are used to capture HDR images then at least two or more images of a scene are obtained by the image sensor using exposure bracketing or conversion gain with single exposure time and then are either combined by the ISP or HP to produce images that preserve local contrast for a natural rendering or exaggerate local contrast for artistic effect. HDR is very useful for capturing scenes containing very bright, direct sunlight or extreme shade. The combination of the images can also be referred to as fusing or merging the images. Thereby, the images may be separately captured by the image sensor, in this case it can also be said that two shots of the scene are taken, or the at least two images can also be represented by different sets of sub-pixels of a superpixel, if binning is used. However, it should also be contemplated that also separate images can be taken using different binning modes for each of the separately taken images. Hence, each image may be taken using a different number of combined, i.e. binned, pixels.

Obtaining more than one image by an image sensor and providing the user with a preview of the fused image takes a lot of resources of the device. In particular when the device is a mobile one, the device is likely to be powered by a battery such that any unnecessary power drainage needs to be avoided. This need is fulfilled by the disclosure of the current invention, by providing a method, an apparatus and a non-transitory computer-readable medium for obtaining and fusing images in a power efficient manner.

FIG. 1 illustrates a device 110 that includes display 130. Device 110 may be a dedicated camera device or may be a multi-function device such as a mobile phone with an integrated camera comprising at least one image sensor. In other embodiments, device 110 may be any device such as a laptop, phone, tablet, phablet, a desktop with an inbuilt or plug-in camera device, or any other such computing device.

As shown in FIG. 1, display 130 of device 110 is filled with an image 125 of a scene 100 that may be captured by an image capturing device of device 110. The image capturing device is not shown in FIG. 1 since it is on the backside of device 110, hence on the side opposing the display 130. The image capturing device will be explained in further detail below. The display 130 may be based on a liquid crystal display (LCD) technology, light-emitting polymer display (LPD) technology, organic light-emitting diode (OLED) technology or some other display technology.

The scene 100 shown here is a countryside with a road. The image 125 as shown on display 130 of device 110 is a combination of several images 115A, 115B, 115C of scene 100. Thereby, images 115A, 115B and 115C may be obtained by different image sensors or by the same image sensor of an image capturing device of device 110. It is also contemplated that for example images 115A and 115B are obtained from the same image sensor whereas image 115C is obtained from another image sensor. This shall however not be understood to be limiting, the images 115A, 115B and 115C may be obtained by any number of image sensors in any possible combination. It is also contemplated that each of the images 115A, 115B, and 115C is constituted by a different set of sub-pixels of a superpixel image. Each of the three images 115A, 115B and 115C may be associated with at least one parameter, wherein the parameter may relate to the settings of the image sensor. For example, the at least one parameter may be the exposure time of the respective image and/or the pixel count value with which the image sensor is obtaining the respective image. As evident to a person skilled in the art although here three images 115A, 115B, and 115C are shown which are combined, any number of images may be combined. A combination is already given if at least two images, for example images 115A and 115B, are combined. Therefore, in the following it is only referred to a combination of images 115A and 115B, but it should be contemplated that any number of images may be combined. The combination of images can be done in a known HDR manner. Thereby, in order to display the fused image on display 130 of device 110, a tone mapping may be performed, which maps a set of colors to another to approximate the appearance of an HDR image on the display 130. This is necessary since commonly displays of mobile phone have a limited dynamic range that is inadequate to reproduce the full range of light intensities present in the HDR image.

On the display 130 also a capture button 150 is shown, which is introduced by the software of the device 110 to give the user a sense and feel of a button which can be pressed to capture the image. Capturing the image in this sense would be accompanied by storing the combined images 115A and 115B of scene 100 into a memory of the device. As such at the time instance shown in FIG. 1 only a preview of the image of the scene 100 is shown which has not yet been stored in the memory of the device 110. That only a preview is shown is also highlighted by displaying the word "PREVIEW" on display 130. It shall however be contemplated that this is only done for illustrative purposes and does not need to be shown on an actual display 130 of an actual device 110. As common with nowadays mobile phones, before an image is captured and permanently saved to a memory of the device 110 and/or uploaded to a cloud storage, a preview of the to be captured image is shown on the display 130.

On the display 130 also a dashed lined rectangular 140 is shown, which indicates a region of interest (ROI) by the user. It shall be understood that the dashed lines will not need be shown on an actual display 130 of an actual device 110, but can be, however is here used for illustrative purposes only. It is known that region 140 is of interest since the user has performed a zoom in action 145 within this region. The zoom in action is indicated by the sliding separation of the thumb and the index finger of the schematic hand across display 130, which may function as a user interface. The user interface may be a capacitive or resistive touch screen and may be sensitive to haptic and/or tactile contact with a user. In such embodiments, the display 130 may comprise a multi-touch-sensitive display. In an alternative the region of interest 140 may also be obtained around a predefined area of a double touch of the user interface. Thereby, a preset zoom may be performed based on the double touch. However also other user actions are contemplated to define the region of interest. For example, circling in a region of interest may also suffice to define the region of interest.

Figure 2:
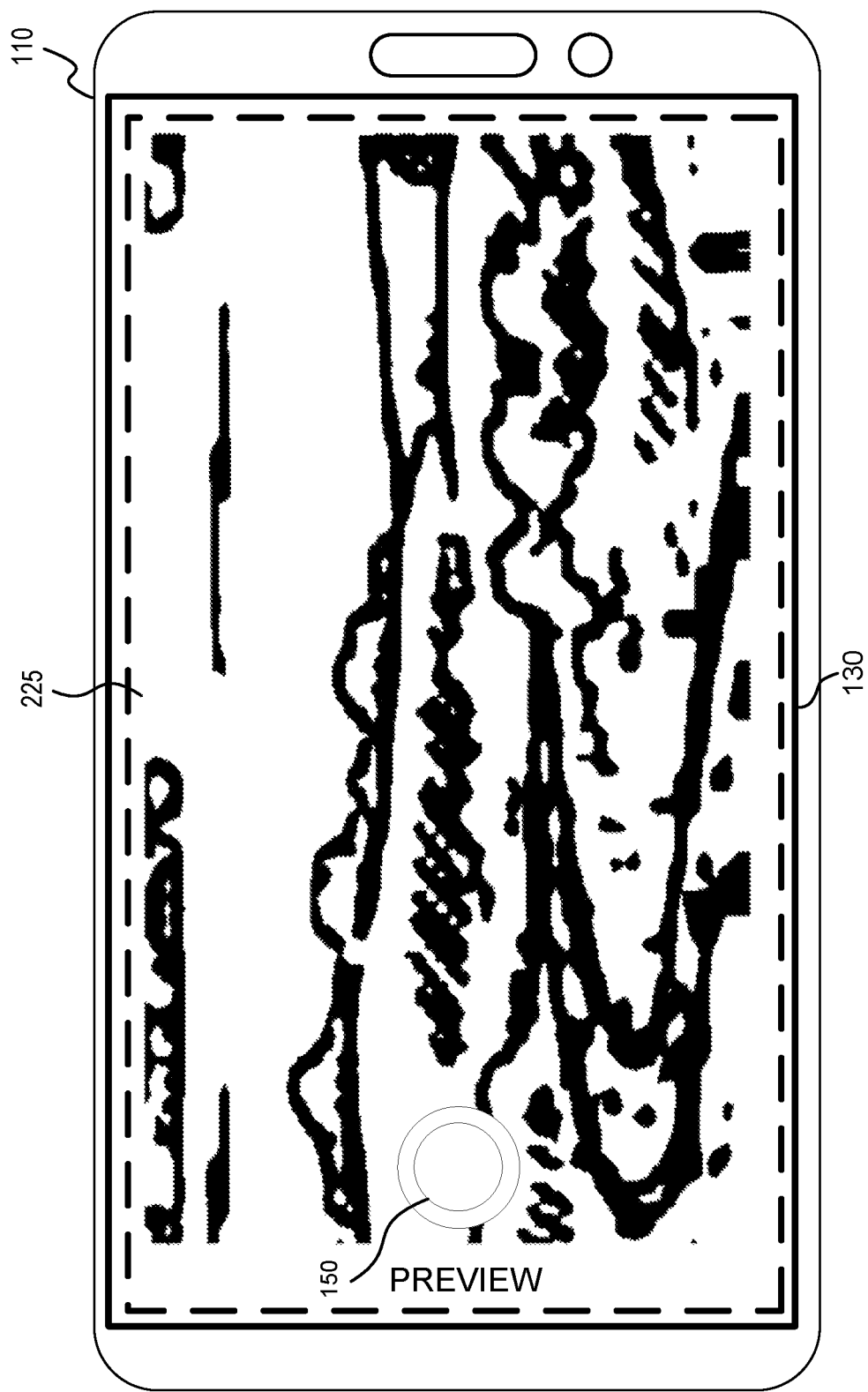
FIG. 2 illustrates aspects of the device shown in FIG. 1 with a zoomed in view of a scene in low resolution.

FIG. 2 illustrates the device 110 of FIG. 1 whereby the region of interest is shown on display 130, hence the region onto which in FIG. 1 it was zoomed in. It can also be said that the field of view has changed from the complete scene as shown in FIG. 1 to the portion of the scene as now shown in FIG. 2. It can also be said that the zoom factor has changed. In FIG. 1 the zoom factor may be one, whereas in FIG. 2 the zoom factor has changed to a value greater or equal to two. Again, here the dashed lines are used for illustrative purposes only to indicate that the image 225 which is shown on the display 130 is the region of interest as indicated in FIG. 1. As can be seen here the image 225 is quite blurry. In fact, the road which was clearly visible on image 125 of FIG. 1 is only hardly to make out in image 225. Furthermore, the mountains and clouds of the countryside scene 100 as shown in FIG. 1 are hard to recognize. The loss in resolution as such seems not tolerable, because it would be recognized by the user as bad image quality if image 225 of the region of interest would be captured as such.

Since such a resolution loss is not tolerable, the embodiment according to the present invention suggests to adjust at least one parameter of the image sensor for obtaining at least one of the images 115A and 115B as shown in FIG. 1 which are used to present the combined image 125 in FIG. 1 and the zoomed in region of interest in FIG. 2. Thereby, the image sensor may at first operate in a low power mode and may have obtained at least one of the images 115A and 115B or both of them with a low power setting. For example, image 115A may be obtained using a first resolution and image 115B may be obtained with a second resolution, wherein the first and second resolutions are different and at least one of the first resolution and the second resolution may be lower than the full resolution capability of the image sensor. It can also be said that the pixel count value for one of the images is lower than the other. For example, image 115A may have been obtained with a high pixel count value, whereas the second image 115B may have been obtained with a lower pixel count value, e.g. more pixels have been binned. It can as such also be said the first image 115A may be obtained using the full resolution capability of the image sensor, whereas image 115B may be obtained with a lower resolution. The lower resolution may be half, a quarter or any other fraction of the full resolution capability. However, it is also contemplated that each images may be obtained with any resolution setting of the image sensor as long as they are different and as long as at least one is lower than the full resolution capability of the image sensor. This allows faster and more power efficient combination of the images 115A and 115B as it would be the case if both would be obtained with full resolution. This is due to the fact that less data has to be processed when combining the images 115A and 115B, which in turn reduces the power consumption required by the ISP or HP to combine the images 115A and 115B. In FIG. 1 the combined images 125 has still a sufficient resolution, even if at least one of the images 115A and 115B were obtained with lower resolution than the full resolution capability of the image sensor. However, once it was zoomed in by the user into the region of interest 140 and therefore the field of view has changed, the resulting combination of images 115A and 115B encounters a non-tolerable resolution loss due to the fact that at least one of the images 115A and 115B was not obtained with full resolution. However, due to this leading to a non-tolerable resolution loss, the at least one setting of the image sensor needs to be adjusted to obtain further two images for a further fusion.

It is contemplated that device 110 always starts in a low power mode setting in which at least one of the two images 115A and 115B is obtained using a parameter which has a value lower than the full capacity associated with that parameter. For example, if the parameter is the pixel count value used by the image sensor to obtain the image, then from the beginning on a lower pixel count value as compared to the full pixel count capability of the image sensor may be used to obtain at least one of the two images in order to save power. This may also not be problematic, since at first the widest possible field of view is presented to the user in a preview and only when the user interacts with this preview, for example, selects a particular region of interest, for example by zooming in, the initial setting may not be sufficient anymore and the parameters with which the at least one of the images is obtained needs to be adjusted to yield to a better result.

Figure 3:
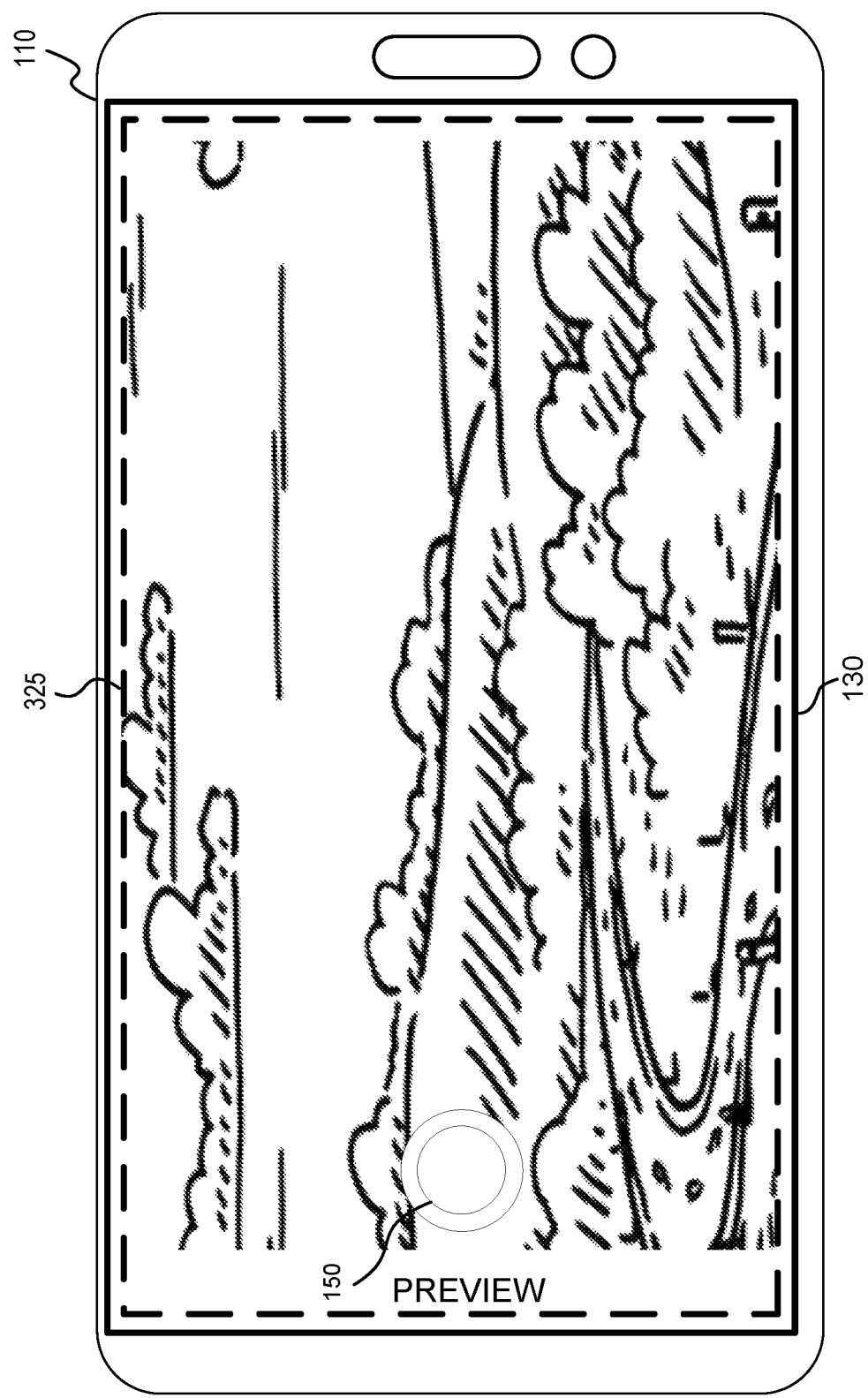
FIG. 3 illustrates aspects of the device shown in FIG. 1 with a zoomed in view of a scene in high resolution.

FIG. 3 illustrates the device 110 of FIG. 1 with the display 130. On the display 130 a combined image 325 is shown, which results from a combination of further at least two images, but wherein for at least one of the images an associated parameter has been adjusted as compared to the parameters used for the images 115A and 115B. In the here shown embodiment example, the pixel count value used by the image sensor to obtain at least one of images 115A and 115B has been adjusted so that both further images are obtained using the full pixel count capability of the image sensor. It can also be said that both further images are captured using a full resolution. This in turn increases the power requirements of the ISP and/or HP but leads to a sharp high-resolution fused image 325 of the region of interest 140. As can be seen in FIG. 3, when both further images are obtained with higher resolution, as compared to the case in FIG. 2, then the road as well as the mountains and clouds of scene 100 are clearly visible in the resulting combined images 325, such that when the user now presses the virtual capture button 150, combined image 325 is stored with a tolerable resolution.

The process shown in FIGS. 1 to 3 can be described as an image capturing technique wherein the parameters associated with the obtained images are dependent upon a zoom factor which characterizes the field of view. The field of view can also be referred to as the area of an image a user wants to focus on. This focusing may be performed by a user interaction, like a zoom in action on the preview of an image. The region of interest is as such directly linked to the user interaction, for example a zoom in action, performed by the user. According to the technique described herein, the user interaction with a preview of an image, influences the parameters used to obtain images, in particular images used for HDR fusing.

Although in the above example, a zoom in action is described which leads to an increase in the pixel count value used to obtain the further images for the fused image, also the opposite may be performed. In case the action is a zoom out action, then it can be determined that the further images may be obtained using for at least one of the further images a lower pixel count value, if the resulting fused image still has a tolerable resolution. Using a lower pixel count value allows to save power.

Figure 4:
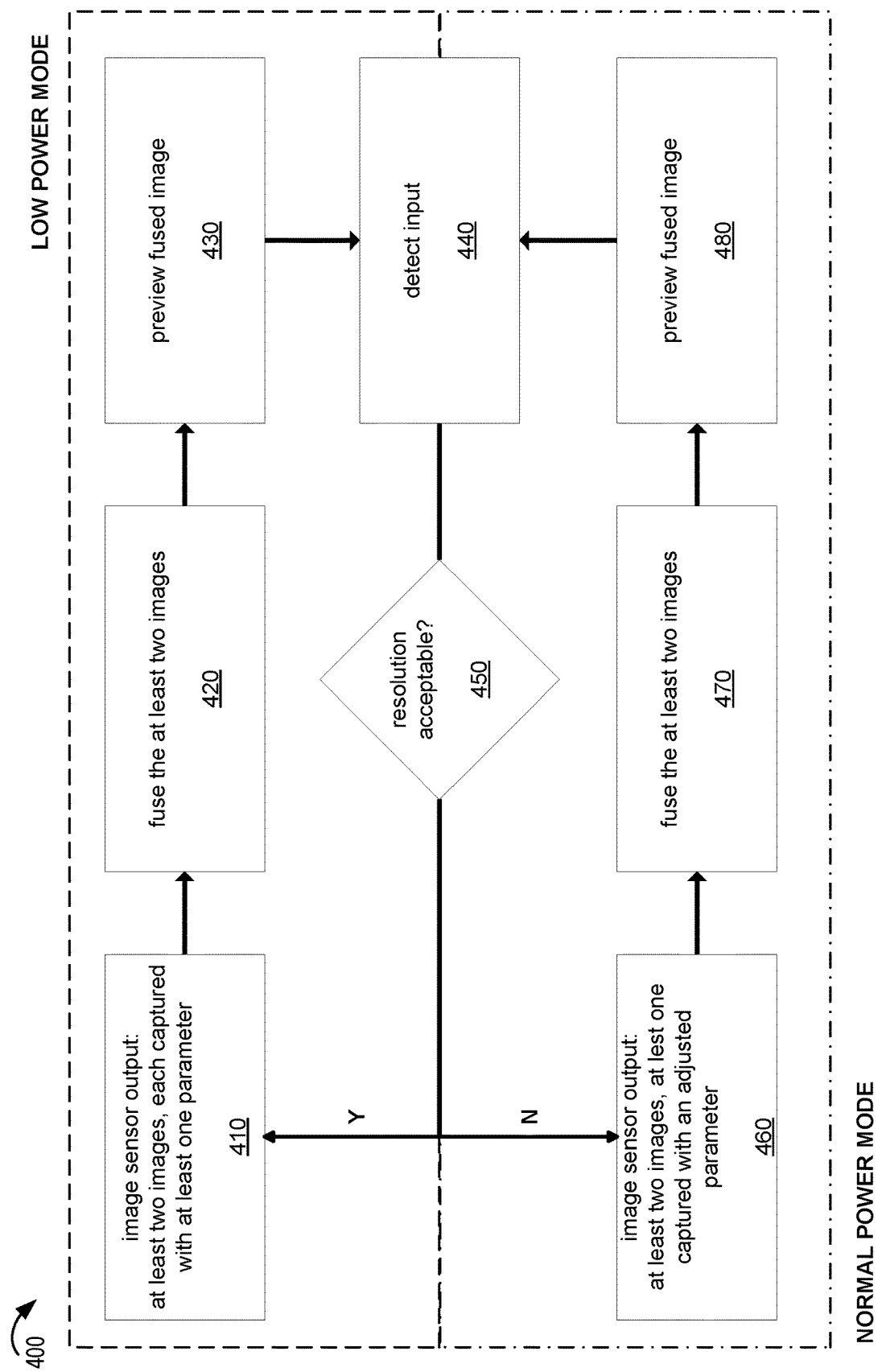
FIG. 4 depicts a decision diagram for changing parameters for performing image capturing in accordance with the embodiments described herein from a normal power mode to a low power mode.

FIG. 4 illustrates a decision diagram 400 according to an aspect of the invention for adjusting parameters for obtaining images to be fused. The decision diagram starts at block 410, which can also be referred to as the initial starting point of the decision flow according to the invention. In this block the image sensor of the camera outputs at least two images, each captured with at least one parameter. The at least one parameter may be associated with the pixel count value used to obtain the image. Further also other parameters may be contemplated, like the exposure time, the gain or other of the above-mentioned settings used by an image sensor. Just for better understanding, it is in the following solely referred to the pixel count value or interchangeably the resolution, however, this shall not be understood in a limiting way. After the at least two images have been obtained by the image sensor they are fused in block 420. The fusing may be performed in a pixel-by-pixel manner. Then in block 430 the fused image is previewed. For example, the fused image may be displayed on display 130 of device 110 as shown in FIG. 1. If then an input is detected at block 440 the decision flow progresses to block 450. The input as received in block 440 may be received from a user of the device 110, for example in form of a zoom action performed on display 130. However, it is also contemplated that the input is received by software. For example, the field of view, e.g. the region of interest onto which it shall be zoomed in is given by a software used for face recognition or for object tracing. It shall be understood that the input may as such originate from a user of device 110 or from a software analyzing the images provided by device 110. At block 450 it is determined whether the fused image at the region of interest has still an acceptable resolution. Here it may be determined whether the pixel count of the fused image in the region of interest still is above a threshold. The threshold can for example be set based on recognizable resolution losses. For example, would a user with the respective resolution recognize a blur in the resulting image or would it not be visible by the user. The threshold for example may be associated with the amount of texture still visible in the region of interest. Furthermore, the threshold may also be associated with the zoom factor. Above a certain zoom factor, the fused image shown in the display may exhibit noticeable artefacts. Thereby, how the threshold is set may dependent upon the image sensor used, the initial parameters used to obtain the images, the display capability, and/or any combination thereof.

If at block 450 it is determined that the resolution of the fused image in the region of interest is still acceptable, then it is returned to block 410 in the decision flow and the loop begins again. This upper loop may also be referred to as the low power mode of the device. In this low power mode, the images obtained in block 410 or at least one of the images may be associated with a parameter, which does not use the full capability of the image sensor, for example the pixel count capability of the image sensor. Using not the full capability of the image sensor, e.g. the full resolution, allows a power efficient fusing of the images at block 420. For example, the parameter associated with the first image may be a full resolution, hence, the image sensor to obtain the first image may be configured to use its full resolution capability to obtain the first image. The parameter associated with the second image may be a lower resolution, hence, the image sensor to obtain the second image may be configured to use a lower resolution than its full resolution capability to obtain the second image. For example, the first parameter may be full resolution and the second parameter may be half resolution. Following this example, the first image is obtained with the full resolution capability of the image sensor, whereas the second image is obtained only using half of the image sensor resolution capability. This allows not only a power efficient obtaining of the images, since less data has to be captured, but also allows a power efficient fusing of the images, since less data have to be processed. As always, despite the fact that only two images and two parameters are named here, also more than two images may be obtained and fused and also each image may be associated with more than one parameter.

The low power mode may be used as the default power mode of a device, like device 110 as shown in FIGS. 1 to 3 in order to keep power consumption low. This is also possible since as long as no input is detected the low power mode settings are preferably as such that the fused image at block 420 has a sufficient quality, without noticeable deterioration or artefacts. It can also be said that the low power mode is associated with parameter settings used by the at least one image sensor, which are lower than the ones used in the normal power mode, which will be discussed further below.

If at block 450 it is determined that the resolution of the fused image in the region of interest is not acceptable anymore, then the decision flow continues with block 460. In block 460, at least one parameter associated with at least one of further to be obtained images is adjusted. For example, the setting of the image sensor with regards to the utilized resolution for obtaining a third image or a fourth image may be increased as compared to the settings used for the first image and/or the second image. Thereby, it may be that at block 410 the first image was obtained using the full resolution capability of the image sensor, whereas the second image was obtained using half of the resolution capability of the image sensor. If this did not lead to a fused image which at the region of interest had an acceptable resolution, then at block 460 the third image and the fourth image are obtained both using the full resolution capability of the image sensor. Hence, in comparison to obtaining the first image with full resolution and the second image with half resolution, the third image and fourth images are now obtained both with full resolution. Hence, at least one parameter associated with one image is increased from half resolution to full resolution. Although it is only described that one parameter associated with one image is adjusted, also more than one parameter may be adjusted. Furthermore, also for both of the third image and fourth image the respective parameters may be adjusted. The images obtained at block 460 are then fused in block 470. This will result in a different fused image as in block 420, since for at least one image the at least one associated parameter has been adjusted. The fused image is then again provided as preview in block 480. If the resulting fused image is acceptable at block 480, it can be captured and stored to memory and/or uploaded to a cloud. In this case, the decision flow ends at block 480. If, however, again in block 440 an input is detected, again a decision with regards to the acceptability of the resolution is performed in block 450. This lower decision loop may also be referred to as the normal power mode of the device, since in this case the adjusted parameter leads to the fact that more data is captured and more data needs to be processed as it is the case in the low power mode.

It shall be understood that the lower decision loop referring to the normal power mode and in particular block 460 may be iteratively passed through, meaning that with each encounter of block 460 the at least one parameter is further adapted. For example, if the at least one parameter relates to the resolution used by the image sensor to obtain the image, then with every encounter of block 460, the resolution may be increased until a point when the resolution of the fused image is acceptable, or the full capability of the image sensor is reached. In order to not put too much overhead on the device, it shall be contemplated that the iterations may not outweigh the power savings. Hence, only a limited number of iterations may be allowed before the parameter is adjusted to the full capability of the image sensor, since than obtaining the images at full capability of the image sensor and fusing them may be more power efficient than using more iterations.

It shall be contemplated that all blocks apart from block 440 in which the input is detected can run automatically, without any input necessary. This allows the decisions to be performed in nearly real time, which enhances the user experience. Meaning if the user performs a zoom in action, which is detected in block 440 this will nearly instantaneously lead to a new preview of the region of interest with either the non-adjusted or adjusted parameters such that the user will not experience any delay in the preview and will have a seamless user experience in the image capturing. The adjustment used in block 460 may for this purpose be preset, before the image capturing starts. Thereby the adjustment can either be already present in instructions of the operating software of the ISP or HP, or may be variable adjustments, which can be set by the user. For example, if the parameter relates to the resolution, the software instructions may be as such, that in the low power mode, at least one image is always obtained using the full resolution capability of the image sensor, whereas the other image is obtained using only half of the resolution capability of the image sensor. In the normal power mode, for both images the full resolution capability of the image sensor may be used. However, also other values are contemplated, and it is also contemplated that the user may set these respective values. Furthermore, it is also contemplated that the values are relating directly to the current power setting of the device or the current battery power left. For example, lower values may be used if the power setting of the device is as such to save as much power as possible or the battery power is already low. On the contrary, if the device is on a high-power mode, or is connected to a power supply, already from the beginning higher values may be used for the parameters. As such, not only the region of interest defined by the user input may alter the parameters used to obtain the images for the HDR image capturing, but also the power mode the device is currently in.

It shall be contemplated that although in the above case is described that the device switches from the low power mode to the normal power mode based on a zoom in action, also the reverse is possible, hence from a normal power mode to a low power mode, in case of a zoom out action is encountered. Hence, if the user alters the field of view by zooming out, the current parameter settings may be adjusted in a way to use lower setting of the image sensor capability, e.g. using a lower resolution, such that less power is used. This can for example be the case, if a lowering the parameter associated with at least one image would still lead to a fused image in which no noticeable artefacts are visible. For example, if the fused image is a result of two full resolution images and the user zooms out, then without any loss in resolution, the fused image may also be obtained using a full resolution image and one half resolution image. Hence, at least one parameter associated in obtaining one image can be decreased. This in turn will save power, since not only less data has to be captured, but also less data has to be combined. Although it is only described to lower one parameter, as in the abovementioned switch from the low power mode to the normal power more also more than one parameter may be decreased. The decreasing of the at lest one parameter may also be performed in a stepwise manner.

Figure 5:
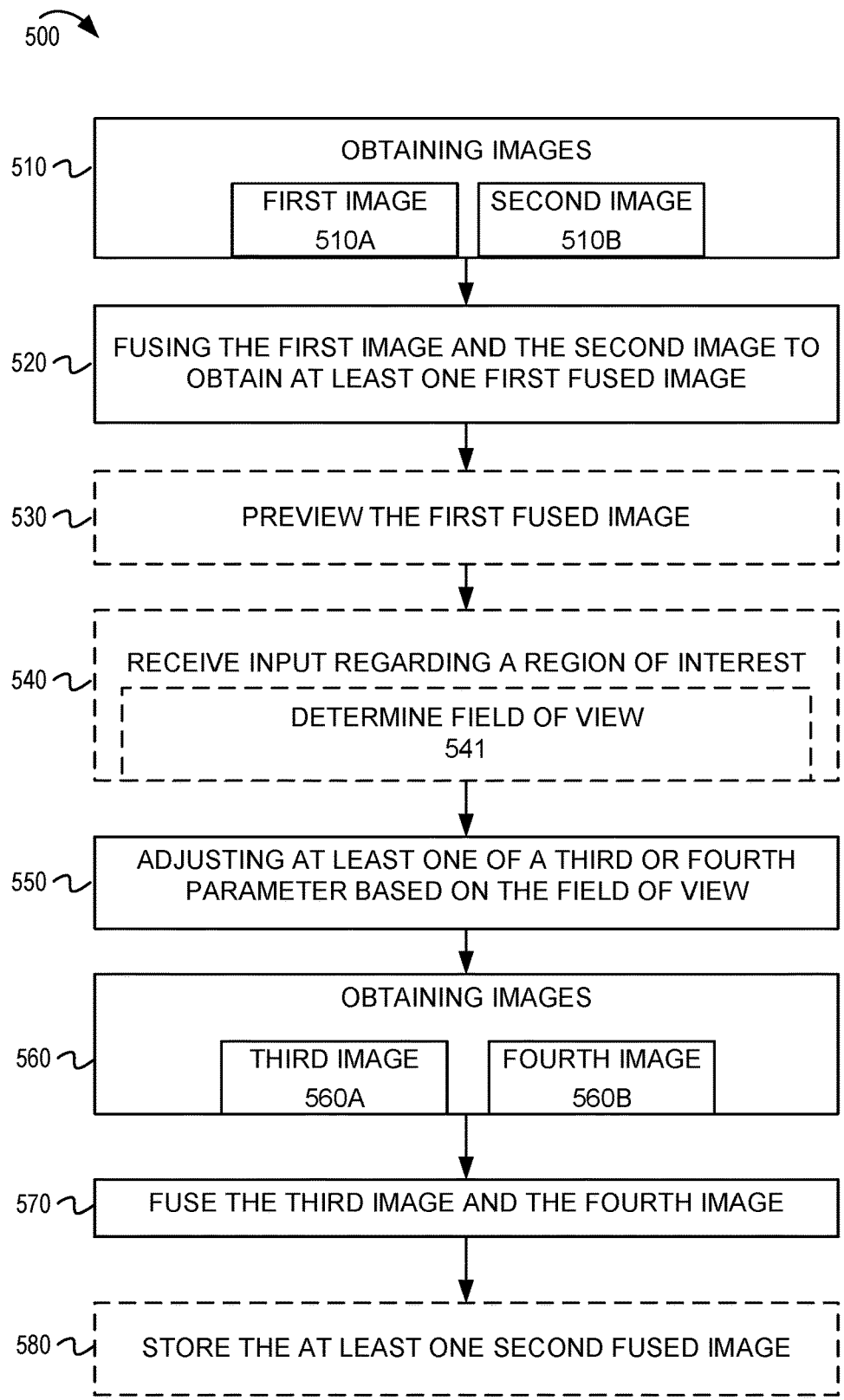
FIG. 5 depicts a method for performing image capturing in accordance with the embodiments described herein.

FIG. 5 shows a detailed method 500 by which a device such as a mobile device as shown in FIG. 1, namely device 110, may implement the image capturing and fusing as described herein. In step 510 at least two first images of a scene are obtained, wherein each of the at least two first images are associated with at least one parameter. In the here shown embodiment example, a first image is obtained at step 510A and a second image is obtained at step 510B. As already described above, the at least two obtained images may be used for HDR image capturing. Each of the images may be associated with a parameter. As described above, the parameter may be a setting of an image sensor used to obtain the at least one image. It is contemplated that for each images a different parameter may be used. The parameter may for example be the pixel count value used by the at least one image sensor to obtain the images. The pixel count value may also relate to the binning mode used by the image sensor for capturing the respective two images.

In step 520 the obtained at least two images are then fused to obtain at least one first fused image. In the here shown embodiment example, the first image and the second image are fused. The fusing of the at least two images may comprise fusing the at least two first images on a pixel-by-pixel basis.

The method may also optionally comprise step 530 in which the first fused image is provided as preview. It is however also contemplated that the first image is sent to another device and is previewed there to a user. The preview of the first fused image comprises displaying the image on a display of the device itself or the device to which the first fused image is sent. The displaying of the first fused image may comprise that a tone mapping is performed to adapt the image to the capability of the display.

In step 540 input regarding a region of interest is received. The region of interest refers to a particular area of the first fused image. With this information a field of view may be determined at step 541. The region of interest may be selected by a user of the device, for example by marking the region on the touch screen of the device. Alternatively or additionally, the input may be a zoom in or zoom out action performed by the user, for example by separating or moving together two fingers on the touch screen of the device. The area of interest may however also be given by other means or may be defined by an automated process. For example, a face or object recognition software may define areas of interest where faces or specific objects are visible in the scene. The software may then provide the input regarding the area of interest. In a video sequence the area of interest may also be given by tracing persons or objects. As such, the input received may either be from a user of the device and/or from software.

In step 550 at least one of a third parameter or fourth parameter used for obtaining at least two second images in a subsequent step is adjusted. For example, the pixel count value used to obtain the images may be adjusted in order to gain another fused image which in the region of interest still has a sufficient resolution. This sufficient resolution may be defined by the amount of textures which are still visible. Also other criteria may be used to define when the parameter needs to be adjusted. For example, the parameter may also be adjusted based on power considerations of the device. The parameters associated with the first image and the second image may be correlated to the third parameter and the fourth parameter. It can also be said that the third parameter and fourth parameter are adjusted versions of the first parameter and the second parameter. Thereby, the first parameter may relate to the third parameter and the second parameter may relate to the fourth parameter. For example, the first image may be obtained with full resolution, wherein the full resolution is indicated by the first parameter, then the third image may also be obtained with the full resolution, indicated by the third parameter. The second image may be obtained with just half resolution, indicated by the second parameter, then the adjustment of the fourth parameter may cause the image capturing device to obtain the fourth image with a resolution which is different than half the resolution used for the second image. For example, in case the parameter is increased, the fourth image may be taken with a resolution higher than half the resolution, e.g. full resolution. In case the parameter is decreased, the fourth image may be taken with a resolution lower than half the resolution, e.g. quarter resolution. Hence, in this example only one parameter has been adjusted. It is however also contemplated that other correlations and other relationship between the parameters exists and that adjusting the parameters contemplate all possible adjustments. In the foregoing, in case it is referred to resolution, the respective pixel count value used by the image sensor is meant.

As already described above, the adjustment of the at least one parameter may be based on power considerations. The device may as a default operate in a low power mode and use lower values for the parameters associated with the first and second images as in a normal power mode, in which at least one parameter associated with the third image or the fourth image may be increased. The other way around, if the device is already operating in normal power mode and is switched back to low power mode, at least one parameter associated with the third image or the fourth image may be decreased. Hence, a switch of power mode may also lead to an adjustment of the at least one parameter.

Following the adjustment of the at least one parameter in step 560 at least two second images are obtained, wherein at least one of the at least two images is associated with the at least one adjusted parameter. In the here shown embodiment example a third image is obtained at step 560A and a fourth image is obtained at step 560B. If the parameter relates to the pixel count value used by the image sensor to obtain the images, then after the adjustment, the image sensor may use a different pixel count value setting for the image capturing as before the adjustment. This may encompass that the image sensor uses a different pixel image for at least one of the second images as compared to the first images, or for both of the at least two second images.

In step 570 the at least two second images are then fused to obtain at least one second fused image. In the here shown embodiment example, the third image and the fourth image are fused. The second fused image is different to the first fused image by the fact that at least one parameter associated with at least one of the second images is adjusted as compared to the obtaining of the at least two first images. It can also be said that the image sensor has used for at least one of the at least two second images a different setting as compared to obtaining the at least two first images.

The setting used for the image sensor may be directly linked to the power consumption of the device. Thereby a first power mode may be used when obtaining the images in step 510 and fusing the at least two first images in step 520 as compared to a second power mode used when obtaining the images in step 560 and fusing the at least two second images in step 570. Thereby, the first power mode may be associated with a lower power consumption of the device as compared to the second power mode, or the other way around.

Figure 6:
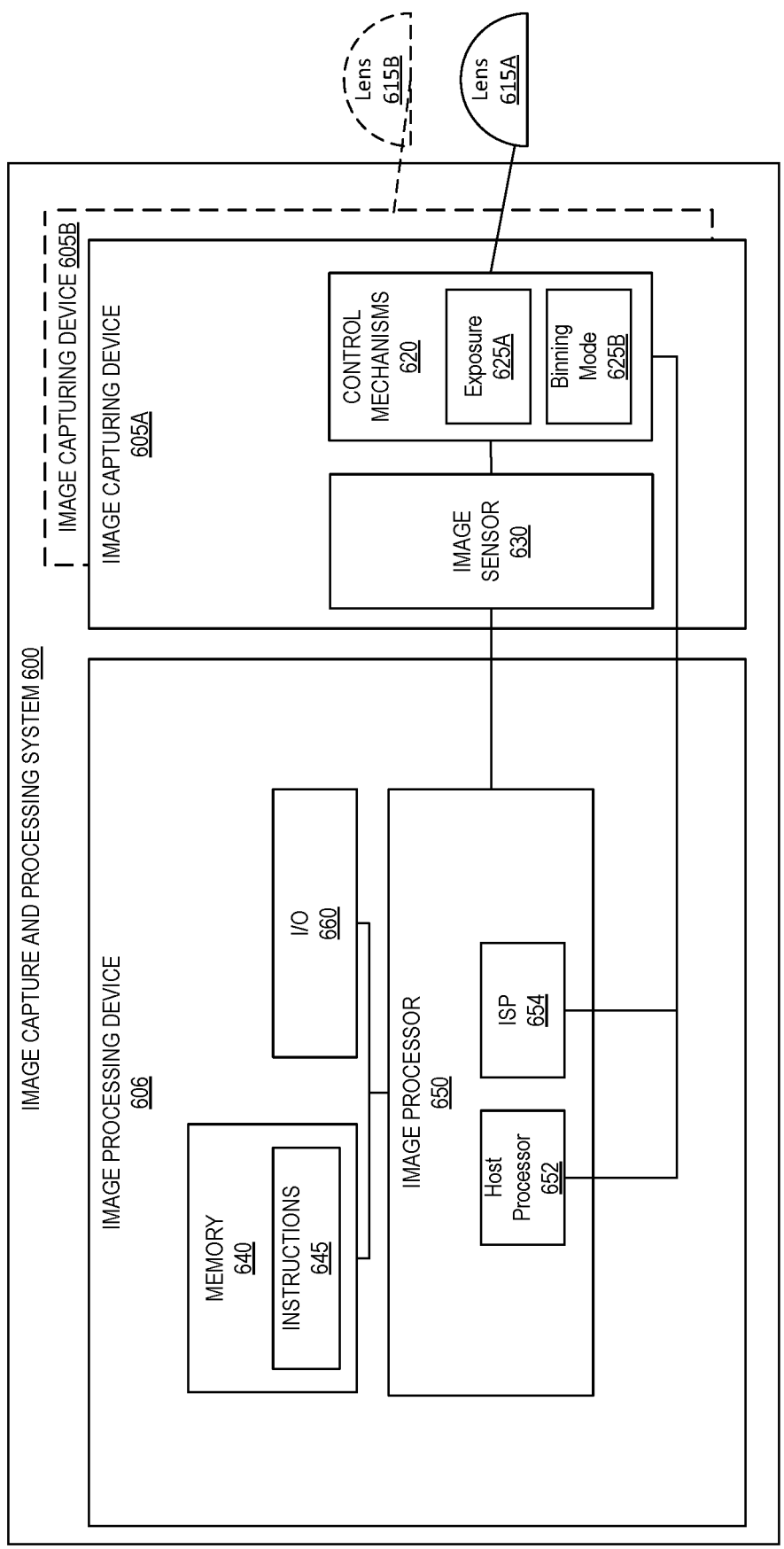
FIG. 6 illustrates an aspect of an image capturing and processing system which may be useable in a device as shown in FIG. 1 to perform the image capturing in accordance with the embodiments described therein.

FIG. 6 is a block diagram illustrating an architecture of an image capture and processing system 600. The image capture and processing system 600 includes various components that are used to capture and process images of scenes (e.g., images of scene 100). The image capture and processing system 600 may for example be part of the device 110 as shown in FIGS. 1 to 3. The image capture and processing system 600 can capture standalone images (or photographs) and/or can capture videos that include multiple images (or video frames) in a particular sequence. A lens 615A of the system 600 faces a scene and receives light from the scene. The lens 615A bends the light toward the image sensor 630. The light received by the lens 615A passes through an aperture controlled by one or more control mechanisms 620 and is received by the image sensor 630.

The one or more control mechanisms 620 may control exposure, focus, and/or zoom based on information from the image sensor 630 and/or based on information from image processor 650. The one or more control mechanisms 620 may include multiple mechanisms and components; for instance, the control mechanisms 620 may include one or more exposure control mechanisms 625A, one or more binning mode control mechanisms 625B. The one or more control mechanisms 620 may also include additional control mechanisms besides those that are illustrated, such as control mechanisms controlling gain, flash, depth of field, and/or other image capture properties.

The exposure control mechanism 625A of the control mechanisms 620 can obtain an exposure setting. In some cases, the exposure control mechanism 625A stores the exposure setting in a memory register. Based on this exposure setting, the exposure control mechanism 625A can control a size of the aperture (e.g., aperture size or f/stop), a duration of time for which the aperture is open (e.g., exposure time or shutter speed), a sensitivity of the image sensor 630 (e.g., ISO speed or film speed). The binning mode control mechanism 625B may control the binning mode applied, for example how many pixels are combined together to form a superpixel.

The image sensor 630 includes one or more arrays of photodiodes or other photosensitive elements. Each photodiode measures an amount of light that eventually corresponds to a particular pixel in the image produced by the image sensor 630. In some cases, different photodiodes may be covered by different color filters, and may thus measure light matching the color of the filter covering the photodiode. For instance, Bayer color filters include red color filters, blue color filters, and green color filters, with each pixel of the image generated based on red light data from at least one photodiode covered in a red color filter, blue light data from at least one photodiode covered in a blue color filter, and green light data from at least one photodiode covered in a green color filter. Other types of color filters may use yellow, magenta, and/or cyan (also referred to as "emerald") color filters instead of or in addition to red, blue, and/or green color filters. Some image sensors may lack color filters altogether, and may instead use different photodiodes throughout the pixel array (in some cases vertically stacked). The different photodiodes throughout the pixel array can have different spectral sensitivity curves, therefore responding to different wavelengths of light. Monochrome image sensors may also lack color filters and therefore lack color depth.

In some cases, the image sensor 630 may alternately or additionally include opaque and/or reflective masks that block light from reaching certain photodiodes, or portions of certain photodiodes, at certain times and/or from certain angles, which may be used for phase detection autofocus (PDAF). The image sensor 630 may also include an analog gain amplifier to amplify the analog signals output by the photodiodes and/or an analog to digital converter (ADC) to convert the analog signals output of the photodiodes (and/or amplified by the analog gain amplifier) into digital signals. In some cases, certain components or functions discussed with respect to one or more of the control mechanisms 620 may be included instead or additionally in the image sensor 630. The image sensor 630 may be a charge-coupled device (CCD) sensor, an electron-multiplying CCD (EMCCD) sensor, an active-pixel sensor (APS), a complimentary metal-oxide semiconductor (CMOS), an N-type metal-oxide semiconductor (NMOS), a hybrid CCD/CMOS sensor (e.g., sCMOS), or some other combination thereof.

The image processor 650 may include one or more processors, such as one or more image signal processors (ISPs) (including ISP 654), one or more host processors (including host processor 652), and/or one or more of any other type of processor—not shown here. The host processor 652 can be a digital signal processor (DSP) and/or other type of processor. In some implementations, the image processor 650 is a single integrated circuit or chip (e.g., referred to as a system-on-chip or SoC) that includes the host processor 652 and the ISP 654. In some cases, the chip can also include one or more input/output ports (e.g., input/output (I/O) ports), central processing units (CPUs), graphics processing units (GPUs), broadband modems (e.g., 3G, 4G or LTE, 5G, etc.), memory, connectivity components (e.g., Bluetooth™, Global Positioning System (GPS), etc.), any combination thereof, and/or other components. The I/O ports can include any suitable input/output ports or interface according to one or more protocol or specification, such as an Inter-Integrated Circuit 2 (I2C) interface, an Inter-Integrated Circuit 3 (I3C) interface, a Serial Peripheral Interface (SPI) interface, a serial General Purpose Input/Output (GPIO) interface, a Mobile Industry Processor Interface (MIPI) (such as a MIPI CSI-2 physical (PHY) layer port or interface, an Advanced High-performance Bus (AHB) bus, any combination thereof, and/or other input/output port.

The image processor 650 may perform a number of tasks, such as de-mosaicing, color space conversion, image frame downsampling, pixel interpolation, automatic exposure (AE) control, automatic gain control (AGC), CDAF, PDAF, automatic white balance, fusing of images to form an HDR image, image recognition, object recognition, feature recognition, receipt of inputs, managing outputs, managing memory, or some combination thereof. The image processor 650 may store image frames and/or processed images in random access memory (RAM) 640, read-only memory (ROM), a cache, a memory unit (e.g., system memory), another storage device or some combination thereof.

Various input/output (I/O) devices 660 may be connected to the image processor 650. The I/O devices 660 can include a display screen, a keyboard, a keypad, a touchscreen, a trackpad, a touch-sensitive surface, a printer, any other output devices, any other input devices, or some combination thereof. The I/O 660 may include one or more ports, jacks, or other connectors that enable a wired connection between the system 600 and one or more peripheral devices, over which the system 600 may receive data from the one or more peripheral device and/or transmit data to the one or more peripheral devices. The I/O 660 may include one or more wireless transceivers that enable a wireless connection between the system 600 and one or more peripheral devices, over which the system 600 may receive data from the one or more peripheral device and/or transmit data to the one or more peripheral devices. The peripheral devices may include any of the previously discussed types of I/O devices 660 and may themselves be considered I/O devices 660 once they are coupled to the ports, jacks, wireless transceivers, or other wired and/or wireless connectors.

In some cases, the image capture and processing system 600 may be a single device. In some cases, the image capture and processing system 600 may be two or more separate devices, including at least one image capturing device 605A (e.g., a camera) and an image processing device 606 (e.g., a computing device coupled to the camera). In some implementations the image capture and processing system 600 may also comprise a plurality of image capturing devices, as shown here image capturing device 605A and image capturing device 605B, which both may have the same or similar components. In some implementations, the at least one image capture device 605A and the image processing device 606 may be coupled together, for example via one or more wires, cables, or other electrical connectors, and/or wirelessly via one or more wireless transceivers. In some implementations, the at least one image capture device 605A and the image processing device 606 may be disconnected from one another.

The image capture and processing system 600 of FIG. 6 is split into two portions that represent the at least one image capture device 605A and the image processing device 606, respectively. The at least one image capture device 605A includes the lens 615A, control mechanisms 620, and the image sensor 630. The image processing device 606 includes the image processor 650 (including the ISP 654 and the host processor 652), the RAM 640, and the I/O 660. In some cases, certain components illustrated in the image capture device 606, such as the ISP 654 and/or the host processor 652, may be included in the image capture device 605A.

The image capture and processing system 600 can include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the image capture and processing system 600 can include one or more wireless transceivers for wireless communications, such as cellular network communications, 802.11 wi-fi communications, wireless local area network (WLAN) communications, or some combination thereof. In some implementations, the at least one image capture device 605A and the image processing device 606 can be different devices. For instance, the at least one image capture device 605A can include a camera device and the image processing device 606 can include a computing device, such as a mobile handset, a desktop computer, or other computing device.

While the image capture and processing system 600 is shown to include certain components, one of ordinary skill will appreciate that the image capture and processing system 600 can include more components than those shown in FIG. 6. The components of the image capture and processing system 600 can include software, hardware, or one or more combinations of software and hardware. For example, in some implementations, the components of the image capture and processing system 600 can include and/or can be implemented using electronic circuits or other electronic hardware, which can include one or more programmable electronic circuits (e.g., microprocessors, GPUs, DSPs, CPUs, and/or other suitable electronic circuits), and/or can include and/or be implemented using computer software, firmware, or any combination thereof, to perform the various operations described herein. The software and/or firmware can include one or more instructions stored on a computer-readable storage medium and executable by one or more processors of the electronic device implementing the image capture and processing system 600.

The host processor 652 can configure the image sensor 630 with new parameter settings (e.g., via an external control interface such as I2C, I3C, SPI, GPIO, and/or other interface). In one illustrative example, the host processor 652 can adjust resolution settings, e.g. binning modes, used by the image sensor 630 based on an evaluation whether a region of interest still provides sufficient texture. The host processor 652 can also dynamically configure the parameter settings of the internal pipelines or modules of the ISP 654 to match the settings of one or more input images from the image sensor 630 so that the image data is correctly processed by the ISP 654. Processing (or pipeline) blocks or modules of the ISP 654 can include modules for lens (or sensor) noise correction, de-mosaicing, color conversion, correction or enhancement/suppression of image attributes, denoising filters, sharpening filters, among others. Each module of the ISP 654 may include a large number of tunable parameter settings. Additionally, modules may be co-dependent as different modules may affect similar aspects of an image. For example, denoising and texture correction or enhancement may both affect high frequency aspects of an image. As a result, a large number of parameters are used by an ISP to generate a final image from a captured raw image.

The technique as described in context of FIGS. 4 and 5 may be implemented in the image capture and processing system 600 which may be part of a device 110 as shown in FIGS. 1 to 3. Thereby, the instructions 645 stored in memory 640 may cause host processor 652 and/or SP 654 to adjust parameters used by image sensor 630 to be adjusted based on input received via I/O 660. For example, the I/O 660 may detect an input of a user of a touch screen 130 as shown in FIG. 1 and based on this input, the region of interest 140 in an image 125 as shown on display 130 as depicted in FIG. 1 may be identified. This region of interest 140 may for example be associated with a zoom in on a particular area of a displayed image such that the field of view changes. Once it is determined by host processor 652 or ISP 654 that the resolution in the region of interest 140 is not sufficient anymore, e.g. the zoom factor has reached a threshold, the host processor 652 or the ISP 654 may adjust at least one setting used by the image sensor 630. The setting can for example be the pixel count value used by the image sensor 630 to obtain the at least one image. In addition or alternatively, the host processor 652 or the ISP 654 may also influence the settings used by the control mechanism 620.

It shall be contemplated that the at least two images used herein to describe the HDR fusing may be obtained by one image capturing device 605A or multiple image capturing devices 605A and 605B. The instructions 645 which cause the host processor 652 or the ISP 654 to adjust the parameters used to obtain the at least two images, may as such adjust at least one of the settings used by the multiple image capturing devices 605A or 605B.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner.

In the above description, reference numbers have sometimes been used in connection with various terms. Where a term is used in connection with a reference number, this may be meant to refer to a specific element that is shown in at least one of the figures. Where a term is used without a reference number, this may be meant to refer generally to the term without limitation to any particular figure.

The terms "couple" or "link" and any variations thereof may indicate a direct or indirect connection between elements. For example, a first element coupled to a second element may be directly connected to the second element, or indirectly connected to the second element through another element.

The term "processor" should be interpreted broadly to encompass a general-purpose processor, a central processing unit (CPU), a microprocessor, a digital signal processor (DSP), a controller, a microcontroller, a state machine, and so forth. Under some circumstances, a "processor" may refer to an application-specific integrated circuit (ASIC), a programmable logic device (PLD), a field-programmable gate array (FPGA), etc. The term "processor" may refer to a combination of processing devices, e.g., a combination of a digital signal processor (DSP) and a microprocessor, a plurality of microprocessors, at least one microprocessor in conjunction with a digital signal processor (DSP) core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to at least one of programs, routines, sub-routines, functions, procedures, etc. "Instructions" and "code" may comprise a single computer-readable statement or many computer-readable statements.

It should be noted that at least one of the features, functions, procedures, components, elements, structures, etc., described in connection with any one of the configurations described herein may be combined with at least one of the functions, procedures, components, elements, structures, etc., described in connection with any of the other configurations described herein, where compatible. In other words, any compatible combination of the functions, procedures, components, elements, etc., described herein may be implemented in accordance with the systems and methods disclosed herein.

The presentation of the described configurations is provided to enable any person skilled in the art to make or use the methods and other structures disclosed herein. The flowcharts, block diagrams and other structures shown and described herein are examples only, and other variants of these structures are also within the scope of the disclosure. Various modifications to these configurations are possible, and the generic principles presented herein may be applied to other configurations as well. Thus, the present disclosure is not intended to be limited to the configurations shown above but rather is to be accorded the widest scope consistent with the principles and novel features disclosed in any fashion herein, including in the attached claims as filed, which form a part of the original disclosure.

Those of skill in the art will understand that information and signals may be represented using any of a variety of different technologies and techniques. For example, data, instructions, commands, information, signals, bits and symbols that may be referenced throughout the above description may be represented by voltages, currents, electromagnetic waves, magnetic fields or particles, optical fields or particles, or any combination thereof.

An apparatus as disclosed herein (e.g., any device configured to perform a technique as described herein) may be implemented in any combination of hardware with software, and/or with firmware, that is deemed suitable for the intended application. For example, the elements of such an apparatus may be fabricated as electronic and/or optical devices residing, for example, on the same chip or among two or more chips in a chipset. One example of such a device is a fixed or programmable array of logic elements, such as transistors or logic gates, and any of these elements may be implemented as one or more such arrays. Any two or more, or even all, of these elements may be implemented within the same array or arrays. Such an array or arrays may be implemented within one or more chips (e.g., within a chipset including two or more chips).

One or more elements of the various implementations of the apparatus disclosed herein may be implemented in whole or in part as one or more sets of instructions arranged to execute on one or more fixed or programmable arrays of logic elements, such as microprocessors, embedded processors, intellectual property (IP) cores, digital signal processors, FPGAs (field-programmable gate arrays), ASSPs (application-specific standard products), and ASICs (application-specific integrated circuits). Any of the various elements of an implementation of an apparatus as disclosed herein may also be embodied as one or more computers (e.g., machines including one or more arrays programmed to execute one or more sets or sequences of instructions, also called "processors"), and any two or more, or even all, of these elements may be implemented within the same such computer or computers.

A processor or other means for processing as disclosed herein may be fabricated as one or more electronic and/or optical devices residing, for example, on the same chip or among two or more chips in a chipset. One example of such a device is a fixed or programmable array of logic elements, such as transistors or logic gates, and any of these elements may be implemented as one or more such arrays. Such an array or arrays may be implemented within one or more chips (for example, within a chipset including two or more chips). Examples of such arrays include fixed or programmable arrays of logic elements, such as microprocessors, embedded processors, IP cores, DSPs, FPGAS, ASSPs and ASICs. A processor or other means for processing as disclosed herein may also be embodied as one or more computers (e.g., machines including one or more arrays programmed to execute one or more sets or sequences of instructions) or other processors. It is possible for a processor as described herein to be used to perform tasks or execute other sets of instructions that are not directly related to a procedure of an implementation of a method as disclosed herein, such as a task relating to another operation of a device or system in which the processor is embedded (e.g., an audio sensing device). It is also possible for part of a method as disclosed herein to be performed by a processor of the audio sensing device and for another part of the method to be performed under the control of one or more other processors.

Those of skill will appreciate that the various illustrative modules, logical blocks, circuits, and tests and other operations described in connection with the configurations disclosed herein may be implemented as electronic hardware, computer software, or combinations of both. Such modules, logical blocks, circuits, and operations may be implemented or performed with a general-purpose processor, a digital signal processor (DSP), an ASIC or ASSP, an FPGA or other programmable logic device, discrete gate or transistor logic, discrete hardware components, or any combination thereof designed to produce the configuration as disclosed herein.

For example, such a configuration may be implemented at least in part as a hard-wired circuit, as a circuit configuration fabricated into an application-specific integrated circuit, or as a firmware program loaded into non-volatile storage or a software program loaded from or into a data storage medium as machine-readable code, such code being instructions executable by an array of logic elements such as a general-purpose processor or other digital signal processing unit. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. A software module may reside in a non-transitory storage medium such as RAM (random-access memory), ROM (read-only memory), nonvolatile RAM (NVRAM) such as flash RAM, erasable programmable ROM (EPROM), electrically erasable programmable ROM (EEPROM), registers, hard disk, a removable disk, or a CD-ROM, or in any other form of storage medium known in the art. An illustrative storage medium is coupled to the processor such that the processor can read information from, and write information to, the storage medium. In the alternative, the storage medium may be integral to the processor. The processor and the storage medium may reside in an ASIC, and the ASIC may reside in a user terminal. In the alternative, the processor and the storage medium may reside as discrete components in a user terminal. The term "computer-program product" refers to a computing device or processor in combination with code or instructions (e.g., a "program") that may be executed, processed or computed by the computing device or processor.

It is noted that the various methods disclosed herein may be performed by an array of logic elements, such as a processor, and that the various elements of an apparatus as described herein may be implemented as modules designed to execute on such an array. As used herein, the term "module" or "sub-module" can refer to any method, apparatus, device, unit or computer-readable data storage medium that includes computer instructions (e.g., logical expressions) in software, hardware or firmware form. It is to be understood that multiple modules or systems can be combined into one module or system and one module or system can be separated into multiple modules or systems to perform the same functions. When implemented in software or other computer-executable instructions, the elements of a process are essentially the code segments to perform the related tasks, such as with routines, programs, objects, components, data structures, and the like. The term "software" should be understood to include source code, assembly language code, machine code, binary code, firmware, macrocode, microcode, any one or more sets or sequences of instructions executable by an array of logic elements, and any combination of such examples. The program or code segments can be stored in a processor-readable medium or transmitted by a computer data signal embodied in a carrier wave over a transmission medium or communication link.

The implementations of methods, schemes, and techniques disclosed herein may also be tangibly embodied (for example, in tangible, computer-readable features of one or more computer-readable storage media as listed herein) as one or more sets of instructions executable by a machine including an array of logic elements (e.g., a processor, microprocessor, microcontroller, or other finite state machine). The term "computer-readable medium" may include any medium that can store or transfer information, including volatile, nonvolatile, removable, and non-removable storage media. Examples of a computer-readable medium include an electronic circuit, a semiconductor memory device, a ROM, a flash memory, an erasable ROM (EROM), a floppy diskette or other magnetic storage, a CD-ROM/DVD or other optical storage, a hard disk or any other medium which can be used to store the desired information, a fiber optic medium, a radio frequency (RF) link, or any other medium which can be used to carry the desired information and can be accessed. The computer data signal may include any signal that can propagate over a transmission medium such as electronic network channels, optical fibers, air, electromagnetic, RF links, etc. The code segments may be downloaded via computer networks such as the Internet or an intranet. In any case, the scope of the present disclosure should not be construed as limited by such embodiments. Each of the tasks of the methods described herein may be embodied directly in hardware, in a software module executed by a processor, or in a combination of the two. In a typical application of an implementation of a method as disclosed herein, an array of logic elements (e.g., logic gates) is configured to perform one, more than one, or even all of the various tasks of the method. One or more (possibly all) of the tasks may also be implemented as code (e.g., one or more sets of instructions), embodied in a computer program product (e.g., one or more data storage media such as disks, flash or other nonvolatile memory cards, semiconductor memory chips, etc.), that is readable and/or executable by a machine (e.g., a computer) including an array of logic elements (e.g., a processor, microprocessor, microcontroller, or other finite state machine). The tasks of an implementation of a method as disclosed herein may also be performed by more than one such array or machine. In these or other implementations, the tasks may be performed within a device for wireless communications such as a cellular telephone or other device having such communications capability. Such a device may be configured to communicate with circuit-switched and/or packet-switched networks (e.g., using one or more protocols such as VoIP). For example, such a device may include RF circuitry configured to receive and/or transmit encoded frames.

It is expressly disclosed that the various methods disclosed herein may be performed by a portable communications device such as a mobile phone, handset, headset, or portable digital assistant (PDA), and that the various apparatus described herein may be included within such a device.

In one or more exemplary embodiments, the operations described herein may be implemented in hardware, software, firmware, or any combination thereof. If implemented in software, such operations may be stored on or transmitted over a computer-readable medium as one or more instructions or code. The term "computer-readable media" includes both computer-readable storage media and communication (e.g., transmission) media. By way of example, and not limitation, computer-readable storage media can comprise an array of storage elements, such as semiconductor memory (which may include without limitation dynamic or static RAM, ROM, EEPROM, and/or flash RAM), or ferroelectric, magnetoresistive, ovonic, polymeric, or phase-change memory; CD-ROM or other optical disk storage; and/or magnetic disk storage or other magnetic storage devices. Such storage media may store information in the form of instructions or data structures that can be accessed by a computer. Communication media can comprise any medium that can be used to carry desired program code in the form of instructions or data structures and that can be accessed by a computer, including any medium that facilitates transfer of a computer program from one place to another. Also, any connection is properly termed a computer-readable medium. For example, if the software is transmitted from a website, server, or other remote source using a coaxial cable, fiber optic cable, twisted pair, digital subscriber line (DSL), or wireless technology such as infrared, radio, and/or microwave, then the coaxial cable, fiber optic cable, twisted pair, DSL, or wireless technology such as infrared, radio, and/or microwave are included in the definition of medium. Disk and disc, as used herein, includes compact disc (CD), laser disc, optical disc, digital versatile disc (DVD), floppy disk and Blu-ray Disc, where disks usually reproduce data magnetically, while discs reproduce data optically with lasers. Combinations of the above should also be included within the scope of computer-readable media.

It is possible for one or more elements of an implementation of an apparatus as described herein to be used to perform tasks or execute other sets of instructions that are not directly related to an operation of the apparatus, such as a task relating to another operation of a device or system in which the apparatus is embedded. It is also possible for one or more elements of an implementation of such an apparatus to have structures in common (e.g., a processor used to execute portions of code corresponding to different elements at different times, a set of instructions executed to perform tasks corresponding to different elements at different times, or an arrangement of electronic and/or optical devices performing operations for different elements at different times).

It is to be understood that the claims are not limited to the precise configuration and components illustrated above. Various modifications, changes and variations may be made in the arrangement, operation and details of the systems, methods, and apparatus described herein without departing from the scope of the claims.

Claim language or other language reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

The invention claimed is:

1. A method for image fusing, the method comprising:
obtaining a first image of a scene associated with a first parameter and having a first field of view, and
obtaining a second image of the scene associated with a second parameter and having the first field of view;
fusing the first image and the second image to obtain a first fused image;
obtaining a third image of the scene associated with a third parameter and having a second field of view, and
obtaining a fourth image of the scene associated with a fourth parameter and having the second field of view, wherein at least one of the third parameter or the fourth parameter is adjusted with respect to at least one of the first parameter or the second parameter, wherein the adjustment is based at least in part on a change between the first field of view and the second field of view; and
fusing the third image and the fourth image to obtain a second fused image.

2. The method of claim 1, further comprising:
previewing the first fused image before obtaining the third image and the fourth image.

3. The method of claim 1, wherein the parameters associated with the images are output pixel count values of the images.

4. The method of claim 3, wherein the output pixel count value associated with an image relates to a binning mode used for obtaining the image.

5. The method of claim 1, further comprising:
adjusting at least one of the third parameter or fourth parameter based on a power mode.

6. The method of claim 5, wherein in a low power mode at least one of the third parameter or fourth parameter is adjusted to have a lower value than in a normal power mode.

7. The method of claim 1, wherein the adjustment is based on a determination whether a threshold is exceeded.

8. The method of claim 7, wherein the threshold is associated with a power consumption.

9. The method of claim 1, wherein the first image and the second image and/or the third image and the fourth image are captured with different exposure values.

10. The method of claim 1, wherein said fusing of the first image and second image comprises fusing the first image and the second image on a pixel-by-pixel basis and/or wherein said fusing of the third image and the fourth image comprises fusing the third image and the fourth image on a pixel-by-pixel basis.

11. The method of claim 1, further comprising:
receiving an input from a user associated with a region of interest in the first fused image and determining the second field of view based on the region of interest.

12. The method of claim 11, wherein the input from the user is a zoom-in or zoom-out action.

13. The method of claim 1, further comprising storing the second fused image.

14. The method of claim 1, wherein the obtaining comprises capturing the images with at least one image capturing device.

15. The method of claim 14, wherein the at least one image capturing device is configured to capture images with different pixel count values.

16. An apparatus for image capturing and fusing, the apparatus comprising:
at least one image capturing device configured to:
obtain a first image of a scene associated with a first parameter and having a first field of view, a second image of the scene associated with a second parameter and having the first field of view,, a third image of the scene associated with a third parameter and having a second field of view, and a fourth image of the scene associated with a fourth parameter and having the second field of view;
at least one or more processors configured to:
fuse the first image and second image to obtain a first fused image;
adjust based at least in part on a change between the first field of view and the second field of view, at least one of the third parameter or the fourth parameter to be used to obtain the third image or the fourth image, wherein the at least one of the third parameter or the fourth parameter is adjusted with respect to at least one of the first parameter or the second parameter; and fuse the third image and the fourth image to obtain a second fused image; and at least one memory for storing the fused images.

17. The apparatus of claim 16, wherein the at least one image capturing device is configured to obtain images with different pixel count values and the parameters associated with the images relate to the pixel count value with which the respective image is obtained.

18. The apparatus of claim 17, wherein the pixel count value of an image is associated with a binning mode used for capturing the image.

19. The apparatus of claim 16, wherein the adjustment is further based on a power mode of the apparatus.

20. The apparatus of claim 16, wherein the one or more processors are configured to adjust at least one of the parameters when a threshold is exceeded.

21. The apparatus of claim 20, wherein the threshold is associated with a power consumption of the apparatus.

22. The apparatus of claim 16, wherein the first image and the second image and/or the third image and the fourth image are captured with different exposure values.

23. The apparatus of claim 16, wherein the one or more processors are configured to fuse the first image and the second image on a pixel-by-pixel basis and/or fuse the third image and the fourth image on a pixel-by-pixel basis.

24. The apparatus of claim 23, wherein the one or more processors are further configured to select for each pixel of the first fused image one pixel from the first image or the second image and to select for each pixel of the second fused image one pixel from the third image or the fourth image.

25. The apparatus of claim 23, wherein the first image is constituted by sub-pixels of a super-pixel image and the second image is constituted by other subpixels of the super-pixel image and the one or more processors are further configured to fuse the sub-pixels, and/or wherein the third image is constituted by sub-pixels of a super-pixel image and the fourth image is constituted by other subpixels of the super-pixel image and the one or more processors are further configured to fuse the sub-pixels.

26. The apparatus of claim 16, wherein the one or more processors are configured to receive an input from a user associated with a region of interest in the first fused image and determining the second field of view based on the region of interest.

27. The apparatus of claim 26, wherein the input from the user is a zoom-in or zoom-out action.

28. The apparatus of claim 16, wherein the apparatus is part of a handheld camera, a mobile phone.

29. An apparatus for image fusing, the apparatus comprising:

means for obtaining a first image of a scene associated with a first parameter and having a first field of view;

means for obtaining a second image of the scene associated with a second parameter and having the first field of view;

means for fusing the first image and the second image to obtain a first fused image;

means for adjusting at least one of a third parameter or a fourth parameter to be used to obtain a third image and a fourth image, wherein the at least one of the third parameter or the fourth parameter is adjusted with respect to at least one of the first parameter or the second parameter, and wherein the adjustment is based at least in part on a change between the first field of view and a second field of view;

means for obtaining the third image of the scene associated with the third parameter and having the second field of view;

means for obtaining the fourth image of the scene associated with the fourth parameter and having the second field of view; and means for fusing the third image and the fourth image to obtain a second fused image.

30. A non-transitory computer-readable medium having stored thereon instructions which, when executed by one or more processors, cause the one or more processors to:

obtain a first image of a scene associated with a first parameter and having a first field of view, and obtain a second image of the scene associated with a second parameter and having the first field of view;

fuse the first image and the second image to obtain a first fused image;

obtain a third image of the scene associated with a third parameter and having a second field of view, and obtain a fourth image of the scene associated with a fourth parameter and having the second field of view, wherein at least one of the third parameter or the fourth parameter is adjusted with respect to at least one of the first parameter or the second parameter, wherein the adjustment is based at least in part on a change between the first field of view and the second field of view; and fuse the third image and the fourth image to obtain a second fused image.

* * * * *